United States Patent [19]

Peacock et al.

[11] Patent Number: 6,054,213
[45] Date of Patent: Apr. 25, 2000

[54] PRESSURE SENSITIVE ADHESIVES FOR USE IN LOW TEMPERATURE CONDITIONS

[75] Inventors: Kenneth Peacock, White Bear Lake; Albert I. Everaerts, Oakdale; Kenneth D. Wilson, Stillwater; Stephen J. Galick, Oakdale, all of Minn.

[73] Assignee: 3M Innovative Properties Company, St. Paul, Minn.

[21] Appl. No.: 09/116,348

[22] Filed: Jul. 13, 1998

Related U.S. Application Data

[63] Continuation of application No. 08/970,252, Nov. 13, 1997, Pat. No. 5,800,919, which is a continuation of application No. 08/664,731, Jun. 17, 1996, abandoned, which is a continuation of application No. 08/613,753, Feb. 26, 1996, abandoned.

[51] Int. Cl.⁷ ....................................................... B32B 7/12
[52] U.S. Cl. .................................. 428/355 AC; 428/345; 428/355 R; 442/151; 442/149
[58] Field of Search .............................. 428/355 AC, 343, 428/345, 350, 351, 352, 353, 354, 355 R, 356; 442/151, 149

[56] References Cited

U.S. PATENT DOCUMENTS

| | | | |
|---|---|---|---|
| 3,314,838 | 4/1967 | Erivin | 156/71 |
| 4,352,359 | 10/1982 | Larimore et al. . | |
| 4,418,120 | 11/1983 | Kealy et al. . | |
| 4,440,829 | 4/1984 | Gerace et al. . | |
| 4,751,121 | 6/1988 | Kiilmel et al. . | |
| 4,923,913 | 5/1990 | Chich et al. . | |
| 4,942,201 | 7/1990 | Briggs et al. . | |
| 4,985,488 | 1/1991 | Landin | 524/555 |
| 5,049,608 | 9/1991 | Medina | 524/375 |
| 5,112,691 | 5/1992 | Briggs et al. . | |
| 5,141,790 | 8/1992 | Calhoun et al. | 428/40 |
| 5,221,706 | 6/1993 | Lee et al. . | |
| 5,225,470 | 7/1993 | Mancinelli . | |
| 5,229,207 | 7/1993 | Paquete et al. . | |
| 5,296,277 | 3/1994 | Wilson et al. | 428/40 |
| 5,349,004 | 9/1994 | Knmar et al. . | |
| 5,373,041 | 12/1994 | Prejean | 524/143 |
| 5,380,779 | 1/1995 | D'Haese . | |
| 5,489,624 | 2/1996 | Kantner et al. . | |
| 5,500,293 | 3/1996 | Lau et al. . | |
| 5,631,082 | 5/1997 | Hirose et al. . | |
| 5,800,919 | 9/1998 | Peacock et al. | 428/355 AC |
| 5,874,143 | 2/1999 | Peloquin et al. . | |

FOREIGN PATENT DOCUMENTS

| | | |
|---|---|---|
| 0 530 729 A1 | 3/1993 | European Pat. Off. . |
| 0 529 231 A1 | 4/1994 | European Pat. Off. . |
| 593231A1 | 4/1994 | European Pat. Off. . |
| 6-322355 | 11/1994 | Japan . |
| WO 95/24310 | 9/1995 | WIPO . |

OTHER PUBLICATIONS

CA Selects Plus: Adhesives, No. 126:75912c, 4, (1997)
"Surfactants For Paints and Coatings, PYCAL® 94, Plasticizer for Emulsion Adhesives", *ICI Surfactants Product Information Bulletin*, 4 pgs., (1995).

*Primary Examiner*—Daniel Zirker
*Attorney, Agent, or Firm*—Dale A. Bjorkman

[57] ABSTRACT

Acrylate copolymer pressure sensitive adhesives (PSAs) which incorporate relatively small amounts of a plasticizer are disclosed. The resulting PSAs exhibit improved low temperature performance and minimal effect on other properties, when used as adhesives for graphic marking films. The adhesive system has been found to allow the graphic marking film to be applied at temperatures as low as 20° F. (−7° C.) and to improve the ability of the film to be applied to a substrate without trapping air between the marking film and the substrate. The adhesive system of the marking film also demonstrates resistance to tenting around the compound curved surfaces of rivet heads and corrugations typical of truck trailer sides.

11 Claims, No Drawings

//PRESSURE SENSITIVE ADHESIVES FOR USE IN LOW TEMPERATURE CONDITIONS

This is a continuation of application Ser. No. 08/970,252 filed Nov. 13, 1997, now U.S. Pat. No. 5,800,919 which is a continuation of application Ser. No. 08/664,731 filed Jun. 17, 1996, abandoned, which is a continuation of application Ser. No. 08/613,753 filed Feb. 26, 1996, abandoned. This application is a continuation of Application No. 08/613,753 filed Feb. 26, 1996.

FIELD OF THE INVENTION

This invention is in the field of pressure sensitive adhesives (PSAs), and more particularly, PSAs having improved tack and application behavior at temperatures below about 40° F. (4.4° C.).

BACKGROUND OF THE INVENTION

Pressure sensitive adhesives based upon polyacrylates or "acrylics" have been, and continue to be, the choice for marking films used in the graphics arts industry. Films having acrylate adhesives are well-known for their unique balance of tack, peel strength, shear holding power and excellent resistance to weathering agents such as sunlight, heat, actinic light, road grime, moisture, oxidation and cleaning agents. Films having acrylic adhesives are very useful where high-performance, durable graphics are desired. Many commercial examples of marking films having acrylic adhesives are known in the art. These include those sold by Minnesota Mining and Manufacturing Company, St. Paul, Minn. (hereafter "3M") under the Scotchcal™ and Controltac™ brand names.

The use of self-adhesive graphics, made from pressure sensitive adhesive films, has many advantages over direct painting or image spraying. Among these advantages are the wide range of decoration conditions possible, remote site decoration, and better image quality and consistency. However, pressure sensitive adhesive graphics can exhibit high tack when working temperatures exceed about 80° F. (27° C.) making installation of large sheets difficult.

A number of patents have addressed the issue of too much tack at high installation temperatures. U.S. Pat. No. 3,314,838 (Erwin) teaches that partially embedding hollow, non-adhesive spheres into the PSA surface renders the adhesive film non-tacky upon contact. Subsequent application of pressure to the film, for example, by pressing with a squeegee, breaks and/or compresses the spheres into the adhesive, instantly allowing the adhesive to contact the substrate and form a bond.

U.S. Pat. Nos. 5,141,790 (Calhoun et al.) and 5,296,277 (Wilson et al.), the teaching of both of which are incorporated herein by reference, further teach that other types of projecting particles, clusters of particles, and adhesive surface features can similarly function to overcome problems of excessive tackiness and preadhesion. These adhesive surface features are particularly useful for extending the useful application temperature range of a PSA film to above 100° F. (38° C.). Commercial examples of such self-adhesive marking films having extended upper working application temperature ranges have been sold by 3M under the Scotchcal™ and Controltac™ brands for many years.

The above examples show that means exist to extend the useful installation temperature range of a PSA film. The ability to apply markings in cold temperature conditions would further expand the usefulness of PSA marking films for remote site application. Adhesive films from a variety of manufacturers are known to have sufficient tack to enable applications to be made at 50–60° F. (10–16° C.) and for limited numbers of products as low as about 40° F. (4.4° C.). For example, 3M's Series 180, Series 160 and Series 3500 films may all be installed at temperatures as low as 40° F. (4.4° C.) to certain surfaces.

However, there still exists a need for new self-adhesive films that are broadly useful over a wide range of surfaces and have sufficient low temperature tack to allow reliable applications to be made at temperatures of 20–30° F. (−7 to −1° C.) or even colder. Such adhesive films would have the potential to save significant installation costs by reducing site and substrate preparation time, lost service time, site overhead, and reinstallation.

For example, self-adhesive markings are commonly used to decorate over-the-road tractor trailers at a wide variety of sites. The trailer surface (substrate) is washed and cleaned to remove grease and oils and then dried. If the trailer is cold, it is heated in the garage environment until it reaches a temperature that will accept application of the graphic markings. The trailer must be maintained at temperatures about 40–60° F. (4.4–16° C.) during the marking application process to enable the adhesive to instantly bond or back to the trailer surface with sufficient strength to keep the marking in place when the trailer is placed back into service. However, in cooler environments, particularly during cooler months of the year, heated garages are required for reliable marking installation, and such access can be expensive. Installation at local service shops and trailer yards would be preferred and less costly. It is therefore highly desirable to have markings with PSAs that are sufficiently tacky to be applied to the temperatures at temperatures at least as low as 20–30° F. (−1 to −7° C.) or lower. Such films would minimize the need for and costs associated with heated application facilities.

European Patent Application 0 593 231, (Carleton), discloses a method for improving the performance of pressure sensitive adhesives below about −17.7° C. (0° F). The method relates to the addition of an ethylene oxide/propylene oxide block copolymer to the adhesive and produces improved peel strength performance of PSAs in freezer-grade applications. This composition addresses the problem of adhesion loss to packages that are cooled after the PSA label is applied. It does not address the issue of increased cold temperature tack to improve application in a cold environment.

U.S. Pat. No. 5,049,608, (Medina), discloses a PSA composition having good low temperature performance. The PSA is a 2-ethylhexyl acrylate/polar monomer copolymer emulsion and contains a nonionic $C_7$ to $C_{18}$ alkylphenoxypoly(ethyleneoxy) ethanol having at least 70 ethyleneoxy units.

Despite the foregoing, a need still exists for PSA marking films that can be readily applied at low temperatures.

SUMMARY OF THE INVENTION

The present invention is directed to adhesive formulations which offer satisfactory tack and initial adhesion to surfaces when applied to those surfaces over a wide temperature range, including temperatures below about 40° F. A(4.4° C.), and result in enhanced shear creep resistance. The invention relates to the discovery that incorporation of a relatively small amount of a liquid plasticizer into the adhesive formulation provides the desired adhesive properties. More particularly, the invention comprises an acrylate copolymer pressure sensitive adhesive system which comprises:
  a) about 100 parts by weight of an acrylate copolymer pressure sensitive adhesive comprising:
    i) from about 70–98% by weight of one or more monofunctional acrylates having nontertiary alkyl groups with between 1 and 14 carbon atoms; and
    ii) from about 30-2% by weight of a polar monomer;

b) 2–10 parts by weight of a plasticizer; and c) optionally, a crosslinking agent for the adhesive.

In one embodiment, the preferred plasticizer is a polyoxyethylene aryl ether such as Pycal® 94 (commercially available from Imperial Chemical Industries, Wilmington, Del.). In another embodiment, the preferred plasticizer is an adipate ester such as diethyladipate (commercially available from Monsanto under the tradename Santicizer® 97). The plasticizer can be added in relatively small amounts (for example, less than about 10 weight parts of Pycal® 94 per 100 dry weight parts of the PSA). The addition of the plasticizer offers great flexibility in processing, as it can be added to a variety of common acrylate adhesives which can be compounded by a variety of methods. The resulting acrylate adhesives can be employed in a variety of adhesive systems including, but not limited to, polymeric solutions, UV polymerized coatings, hot melt coatings, and water-based coatings.

In solution acrylate polymers, plasticizers such as Pycal® 94 are readily soluble alone or in combination with additional common solvents such as ethyl acetate, isopropyl alcohol, and methylethyl ketone. Thus, the desired amount of plasticizer may be readily dissolved in the adhesive solution. When the resulting adhesive is cast and dried, the plasticizer remains uniformly dispersed or dissolved within the adhesive mass. Plasticizers such as Pycal® 94 exhibit little tendency to migrate or volatilize from the adhesive mass or to interfere with the crosslinking reactions, or to separate to the adhesive surface.

Plasticizer-modified acrylic copolymer adhesives, when used in graphic markings, adhere at temperatures as low as 30° F. (−1° C.). These results may be compared to identical films using the same adhesive composition excluding plasticizer, such as Pycal® 94, where application temperatures were only as low as 40–50° F. (4.4–10° C.). For example A in Table 3 below, in the absence of the plasticizer, unprocessed film has been found to offer unsatisfactory application behavior at a temperature of 50° F. (10° C.). In contrast, adhesive A blended with 5% Pycal® 94 has acceptable application behavior at 40° F. (4.4° C.). Thus, by including the plasticizer, satisfactory application behavior can be achieved at temperatures at least 10° F. lower than the plasticizer-free PSAs. In Table 2 below, the same adhesive composition containing 0–5 parts per hundred Pycal® 94 displayed relatively little difference in peel-back adhesion, shrinkage, and other performance properties.

Graphic marking films whose adhesive has been modified with a plasticizer such as Pycal® 94, exhibit less tendency to unbond and bridge when applied over compound curved surfaces and irregular surfaces such as corrugated trailer sides when compared to unmodified adhesive systems. This unbonding and bridging phenomenon is referred to as tenting and is typically not acceptable to a customer or end-user of the film.

Finally, less application force is required to apply the plasticizer-modified adhesive as compared to the unmodified adhesive. This lower application force benefits the individual applying the graphics by reducing fatigue resulting from repeated application of graphics to a substrate such as a trailer.

Of course, when modifying the subject acrylic PSAs with a plasticizer such as Pycal® 94, it is desirable to add sufficient plasticizer to achieve the desired effect of better and easier graphics applications at lower temperatures, while at the same time causing minimal effects on the rest of the adhesive's desirable properties, such as its internal cohesive strength (shear adhesion), tack and peel adhesion at higher temperatures, etc.

DESCRIPTION OF THE PREFERRED EMBODIMENTS

The graphic marking films of the present invention allow lower temperature application (to 20° F.) as compared to approximately 40–50° F. for the conventional film products. The improvement is brought about by the inclusion of a plasticizer in the adhesive from a group of plasticizers, of which polyoxyethylene aryl ether plasticizers, (i.e., Pycal® 94), and adipate esters, (i.e., Santicizer® 97), are preferred. The effect can be obtained by addition of plasticizer in an amount of a minimum of 1–2 parts dry weight per 100 parts of adhesive solids and up to a maximum of 5–10 parts dry weight per 100 parts of adhesive solids. The amount to be added is determined by the desired end use of the graphic marking film. Typically, enough plasticizer is added to lower the film application temperature sufficiently, causing a minimal deleterious effect on the other properties of the film, such as peel adhesion, shrinkage, slidability, tenting on rivets and corrugations, and overlaps.

The desired effect is to be achieved also with a minimal influence on applications from ambient application temperatures to temperatures in excess of 100° F. The main concerns at elevated temperatures are preadhesion and excessive tackiness of the adhesive system due to the heat and PSA softening. The adhesive system of the present invention, although offering substantial improvements in low temperature performance, also maintain the positionability and other features of Controltac Plus™ graphic marking films at higher temperatures.

As noted above, the preferred plasticizers of this invention are the polyoxyethylene aryl ether, such as Pycal® 94, and the adipate esters, such as Santicizer® 97. A desirable feature of these plasticizers is that these compounds are transparent to the UV wavelengths usually required to UV polymerize or crosslink acrylate copolymer PSAs, and thus do not interfere with the UV polymerizing or UV crosslinking reaction. Secondly, these plasticizers possess sufficiently low vapor pressure so that they are not distilled away when the solvent is dried off in solution coating, or evaporated or distilled when hot melt coated. Some plasticizers, such as Pycal® 94, are water soluble so they may be included in water-based adhesive systems.

Acrylic Pressure Sensitive Adhesives (PSAs)

In general, acrylate solution PSAs with a wide range of compositions are useful. By using crosslinking agents and/or plasticizers or other modifiers, their performance (tack, peel adhesion, shear adhesion, adhesion to specific substrates) can be tailored to a given application. Generally, the properties of the acrylate copolymers are so stable to ambient conditions that heat stabilizers, antioxidants, light inhibitors and other protectants are not required. The adhesives are quite stable over a wide variety of conditions, and they will perform for long periods of time—often outlasting the film backings.

A variety of acrylic pressure sensitive adhesives commonly used in commercial applications for vinyl decorating graphics films include acrylic copolymers having from about 70–98% by weight of one or more monofunctional acrylates having nontertiary alkyl groups with between 1 and 14 carbon atoms and from about 30–2% by weight of a polar monomer.

In a preferred embodiment, the acrylic PSA is a copolymer of ethylenically-unsaturated higher alkyl acrylates ($C_4$–$C_{14}$) such as isooctylacrylate (IOA), 2-ethylhexyl acrylate, 2-methylbutylacrylate (MBA), n-butyl acrylate, methlacrylate (MA), ethylacrylate, and isobornylacrylate (IBA). The polar monomer can comprise ethylenically-unsaturated carboxylic acids such as methacrylic acids, acrylic acids (AA), itaconic acids, β-carboxyethylacrylates, fumaric acid, acrylamides or other polar monomers such as N-vinyl pyrrolidone, N-vinyl caprolactam, 2-hydroxyethyl acrylate, and the like.

Among the specific acrylic PSAs having utility with the present invention are the following:

a) isooctyl acrylate/acrylic acid (IOA/AA) 93/7 wt/wt modified with 16.4 parts by weight (based on 100 parts by weight of adhesive solids) Nirez 2019, (a terpene-phenolic tackifier commercially available from Arizona Chemical). This PSA has an inherent viscosity of 1.75 dl/g in ethyl acetate at a concentration of 0.2 g/dl.

b) 2-methyl butyl acrylate/acrylic acid (2-MBA/AA) 90/10 wt/wt. This PSA has an inherent viscosity of 0.8 dl/g in ethyl acetate at a concentration of 0.2 g/dl.

c) isooctyl acrylate/methyl acrylate/acrylic acid (IOA/MA/AA) 70/22.5/7.5 wt/wt. This PSA has an inherent viscosity of 0.8 dl/g in ethyl acetate at a concentration of 0.2 g/dl.

d) 2-methyl butyl acrylate/acrylamide (2-MBA/Am) 96/4 wt/wt. This PSA has an inherent viscosity of 0.6 dl/g in ethyl acetate at a concentration of 0.2 g/dl.

Crosslinking Agents

In order to increase shear or cohesive strength of acrylic pressure sensitive adhesives, a crosslinking additive is usually incorporated into the PSA. Two main types of crosslinking additives are commonly used. The first crosslinking additive is a thermal crosslinking additive such as a multifunctional aziridine. One example is 1,1'-(1,3-phenylene dicarbonyl)-bis-(2-methylaziridine) (CAS No. 7652-64-4), referred to herein as "Bisamide". Such chemical crosslinkers can be added into solvent-based PSAs after polymerization and activated by heat during oven drying of the coated adhesive.

In another embodiment, chemical crosslinkers which rely upon free radicals to carry out the crosslinking reaction may be employed. Reagents such as, for example, peroxides serve as a precursor source of free radicals. When heated sufficiently, these precursors will generate free radicals which bring about a crosslinking reaction of the polymer chains. A common free radical generating reagent is benzoyl peroxide. Free radical generators are required only in small quantities, but generally require higher temperatures to complete the crosslinking reaction than those required for the bisamide reagent.

The second type of chemical crosslinker is a photosensitive crosslinker which is activated by high intensity ultraviolet (UV) light. Two common photosensitive crosslinkers used for hot melt acrylic PSAs are benzophenone and 4-acryloxybenzophenone which is copolymerized into the PSA polymer. Another photocrosslinker, which can be post-added to the solution polymer and activated by UV light is a triazine; for example 2,4-bis(trichloromethyl)-6-(4-methoxy-phenyl)-s-triazine. These crosslinkers are activated by UV light generated from artificial sources such as medium pressure mercury lamps. Depending on the type of crosslinker, no more than about 0.5% by weight of chemical crosslinker typically is needed to achieve the desired crosslinking.

Aside from thermal or photosensitive crosslinkers, crosslinking may also be achieved using high energy electromagnetic radiation such as gamma or e-beam radiation.

A physical crosslinking agent may also be used. In one embodiment, the physical crosslinking agent is a high $T_g$ macromer such as those based upon polystyrene and polymethylmethacrylate which are used as about 2–6 parts by weight per 100 parts by weight dry adhesive.

Diisocyanates have also been reported as crosslinking agents for adhesives based on copolymers of acrylic acids.

Plasticizers

Plasticizers having use with the current invention include, but are not intended to be limited to, the following:

| Acrylic PSA Plasticizers | | | |
|---|---|---|---|
| Company | Trade Name | Chemical Class | Chemical Name |
| ICI Americas | Pycal 94 | Polyethylene Oxide | Polyoxyethylene Aryl Ether |
| Monsanto | Santicizer 97 | Adipic Acid Ester | Dialkyl Adipate |
| Monsanto | Santicizer 141 | Phosphoric Acid Ester | 2-Ethylhexyl Diphenyl Phosphate |
| Monsanto | Santicizer 154 | Phosphoric Acid Ester | t-Butylphenyl Diphenyl Phosphate |
| Monsanto | DOA | Adipic Acid Ester | Di(2-Ethylhexyl) Adipate |
| Akzo Nobel | Ketjenflex 8 | Sulfonamide | Toluenesulfonamide |
| Velsicol | Benzoflex 9-88 | Benzoic Acid Ester | Dipropylene Glycol Dibenzoate |
| Velsicol | Benzoflex P-200 | Benzoic Acid Ester | Polyethylene Glycol Dibenzoate |
| Rhone-Poulenc | Alkapol SQR-490 | Polypropylene Oxide | Polyoxypropylene Aryl Ether |
| Sartomer | Sartomer 660 (Cryoflex) | Formic Acid Ester | Dibutoxyethoxyethyl Formal |
| Sartomer | Sartomer 650 (Wareflex) | Adipic Acid Ester | Dibutoxyethoxyethyl Adipate |

Of the plasticizers listed, Pycal® 94 and Santicizer® 97 are preferred.

The parts per hundred range of the plasticizers, is determined by the desired effect. Ideally, only the smallest amount of plasticizer to effect improved low temperature application and minimization/elimination of blisters is required or desired. If too much plasticizer is added and too much adhesive softening occurs, then an application problem can occur at the high temperature end of the application scale. The adhesive will be too "sticky" and grabby, and the graphic marking film will tend to preadhere, which makes film application difficult. Also the adhesive can be softened sufficiently to allow for excessive film shrinkage when applied film is subjected to higher than ambient temperatures.

For the purposes of this invention, relatively small amounts of plasticizer are required. Based on 100 parts by weight of PSA solids, up to about 10 parts plasticizer can be used, with the optimum being about 4–6 parts, and about 2–3 parts being the minimum. At the high limit, too much of the shrinkage resistance of the adhesive is lost, and applied graphic marking film shrinkage is excessive. Film lifting (tenting) around rivets and valleys of corrugated and riveted panels can also be a problem at the high limit.

At the other end of the scale, a minimum amount of plasticizer is required to bring about the required improvement in low temperature application. In between the extremes is the preferred amount of required plasticizer, which offers a balance between good low temperature film application and retention of film properties at the high end of the temperature performance range (shrinkage, preadherence, etc.).

Miscellaneous Additives

Since acrylic pressure sensitive adhesives have excellent oxidative stability, additives such as antioxidants and UV light absorbers are generally not needed. In contrast, rubber-based PSAs typically include such additives.

Although not required, small amounts of heat stabilizer, (less than about 0.3% by weight), can be utilized in hot melt acrylic PSAs to increase thermal stability during processing.

In order to enhance tack and peel adhesion of acrylic PSAs, tackifiers may be added. These include Foral® 85 (a glycerol ester of hydrogenated rosin), Pentalyn® H (a pentaerythrol ester of partially hydrogenated rosin). Hercolyn® D (a methyl ester of hydrogenated rosin) and Staybelite® Ester 10 (a low molecular weight glycerol ester of hydrogenated rosin), each available from Hercules, Inc. In one preferred embodiment, Nirez® 2019, a terpene phenolic resin commercially available from Arizona Chemical can be used.

Although not required, in some special applications, fillers (clay) or colorants ($TiO_2$ or carbon black) may be used as additives to impart opacity or color to the adhesive, or to make the adhesive system less expensive.

Backings for Use With Acrylate Copolymer PSAs

In one embodiment of the present invention, backings of plasticized, flexible polyvinylchloride films are used to form graphic marking films. A modified polyvinylchloride film is of interest for destructible or vandal resistant type labels or graphic marking films. This film has been made "brittle" or "tearable" by lowering the plasticizer level and adding a methylacrylate/butylacrylate copolymer resin (Elvacite™ 2013 available from Imperial Chemical Industries, Wilmington, Del.) to the PVC film formulation. These films may be made by casting from organosol solutions or calendered from an extrudable PVC resin.

Other backings of interest include, but are not limited to, polyesters, polyolefins, papers, foils, polyacrylates, polyurethanes, perfluoropolymers, polycarbonates, ethylene vinyl acetates, and the like. Backings of vinyl films, woven and nonwoven sheets, woven and nonwoven fabrics, papers and retroreflective sheeting are intended to be included.

Method of Making Plasticized Acrylate-based PSAs

Solution Acrylate Copolymer PSAs

In acrylate copolymer PSA solutions, the adhesive is generally available as a low viscosity solution. The plasticizer must be soluble in the solvent system and be miscible with the acrylate copolymer PSA matrix. The plasticizer may be added at any time either before or after polymerization. In a preferred embodiment, the plasticizer is added during the dilution to final coating viscosity of the PSA solution after the polymerization reaction.

It has been observed that the viscosity of the PSA solution can be a problem in post-polymerization additions of plasticizer. If the viscosity is too high, uniform blending of the plasticizer into the solution can be a problem. The PSA solution and/or the plasticizer may require dilution with solvent components so that efficient stirring or blending of the components can be accomplished. It is desirable to avoid this, if at all possible, because of added solvent costs, and the added expense of boiling off additional solvent.

Hot-Melt PSAs

For a hot melt acrylate-based PSA, the preferred time to introduce the plasticizer is after the polymerization process. The vapor pressure of the plasticizer must be sufficiently low to avoid removal of the plasticizer during isolation of the hot-melt or during the coating process. Plasticizer could also be added directly to the hot-melt in the melt tank or extrusion equipment (100% solids).

UV Cured PSAs

For a UV-processed, acrylate-based PSA, it is preferred to add the plasticizer to the monomers or the syrup prior to the complete UV polymerization. In this process, the plasticizer should not interfere with the polymerization reaction. Therefore, the plasticizer should not absorb UV radiation in the wavelengths at which the polymerization takes place, significantly retard chain transfer, or inhibit the reaction.

Water-Based PSAs

For water-based acrylate PSAs, the plasticizer should be miscible with the acrylate copolymer PSA. It is not necessary for the plasticizer to be water soluble, but it must form a stable emulsion along with acrylate copolymer PSA. It should not cause the adhesive emulsion to precipitate or coagulate prematurely. Rather, it should form a stable emulsion and not separate on standing, or at least, readily redisperse if it does separate. The plasticizers may be present during emulsion polymerization, yet as above, they should not significantly retard chain transfer or inhibit the reaction.

Utility of the Invention

The main usefulness of the present invention is that graphic marking films employing the inventive adhesives may be applied at relatively low application temperatures, (as low as about 20–30° F. (–7 to –1° C.), compared to 40–50° F. (4–10° C.) for unmodified adhesives of standard films.

Graphic marking films employing the inventive adhesives have been found to apply easier and with less effort. Such films also have less tendency to lift or peel back when applied to compound-curved surfaces, such as rivet heads, or convoluted surfaces, such as corrugated panels for truck sides. When graphic marking films are stretched and stressed during application to these surfaces, there is a tendency for the film to want to recover to its original condition, especially when subjected to future heating. By adding plasticizers such as Pycal® 94 to the adhesive, the effects described above are gained with a minimal effect on the existing properties of the graphic marking film.

As discussed above, when a truck trailer or other vehicle is to be marked with graphics marking films, the trailer is brought into a garaging area to be cleaned. The cleaning usually involves pressure washing with a detergent solution and drying. This is often followed by a wipedown with a solvent in the area where the marking is to be applied. The solvent wipe is done to remove any road grime not removed by the pressure water wash. The solvent is effective in removing grime such as asphalt nibs or oily residues. In cooler climates, when the temperature is lower, garaging is done in a heated environment. The trailer is allowed to warm until the trailer has a surface temperature of 50–60° F. (10–16° C.). Warming is necessary to ensure that the markings will adhere adequately, with no blisters. When the outside temperatures are low (<30° F.) (<–1° C.), the time required for the trailer to reach 50–60° F. (10–16° C.) may require 12–14 hours.

Minimizing the time required to reach a suitable application temperature is desirable, because extended warming periods take the trailer out of service for extended periods of time. Reduction of the marking cycle time restores the truck to service sooner, and results in substantial savings of time and capital. Instead of waiting until the trailer surface temperature reaches 50–60° F. (10–16° C.), the present invention makes it possible to apply the graphic marking film much sooner since the trailer need only to warm to about 20–30° F. (–7 to –1° C.). Additionally, in regions which experience less severe cold-weather temperatures, and where the marking is done outdoors, the season in which markings may be applied may be extended by as much as two months during their colder months.

EXAMPLES

Test Procedures

180° Peel Adhesion

One inch (2.5 cm) wide strips of tape (either processed or unprocessed) are applied to a substrate with two passes of a standard 4.5 pound roller. The substrate may be stainless steel, glass, Fruehauf-painted panel, or Alodine-finished aluminum panels. The tape on the panels is allowed to dwell age for a specified time prior to peeling. Dwell times may be immediate (apply tape and immediately peel), one hour at 72° F. (22° C.)/50% relative humidity, or 24 hr/120° F. (49° C.) of taped panel aging. Any dwell aging may be specified. Peeling of the tape strips from the panel is conducted at a specified peel rate using a stress-strain tensile tester such as an Instron, Lloyd, 1MASS, or Thwing-Albert apparatus, at a constant peel angle of 180°. Peel rates were 12 inches/min as specified in previously incorporated U.S. Pat. No. 5,296,277 (Wilson et al.). All conditions of the test must be specified. The peel adhesion measurement may be given in pounds/inch width, ounces/inch width, or Newtons/25.4 mm width.

The tape strips may be processed or unprocessed samples. Unprocessed samples are film samples tested as produced. Processed film samples are films that are coated with screen printing inks and transparent coatings. In a first step of the process, a black solvent ink (Scotchcal™ 3905) is screen printed onto a film using a 225-mesh polyester screen. The printed film is dried in a forced draft oven for 1 hr at about 150° F. (66° C.). In the second step of the process, the black-printed film is then overcoated with a clear coat (Scotchcal™ 3920) using the same screen and dried an additional 1 hr at about 150° F. (66° C.).

Shrinkage Test

The shrinkage test is an indirect measure of the shear resistance (internal strength) of the adhesive in an actual use situation. On an etched and desmutted aluminum panel, a processed or unprocessed film sample, approximately 2½"×3" (6.4 cm×7.6 cm), is applied using a plastic squeegee. The long direction of the cut film sample coincides with the machine direction (MD) of the film. Perpendicular to the machine direction is the cross direction (CD) of the film. At least three firm squeegee strokes are used to make the film application. A 5 cm cut is made in the film along the CD and similarly along the MD of the film using a razor blade. The sample panel is then placed in an oven at 150° F. (66° C.) for 24 hours. The cut edges of the film will shrink away from one another. After the panel has cooled, the separation of the film along the cut lines at their maximum separation in both the MD and the CD is measured using a microscope. The shrinkage measurement is given in mils (¹⁄₁₀₀₀ inch)(0.025 mm).

Cold Application Test

Processed or unprocessed films are premasked using SCPM-3 premask tape available from 3M. Sample strips approximately 2½"×12" (6.4 cm×30.5 cm) are cut from the premasked film samples with the long axis of the film coinciding with the MD of the marking film. After conditioning both the Fruehauf panels and the premasked film strips for a minimum of one hour at the test temperature. The premasked strips are applied to a Fruehauf-painted panel using 1 pass of a plastic squeegee as follows: The test is repeated in 10° F. increments over a temperature range from about 20° F. to 50° F. (−6.6 to 10° C.) at 50% relative humidity, the squeegee is maintained at a constant 45° angle during the application; a constant application force is applied to the squeegee during the application of the premasked film to the Fruehauf panel. The test is repeated with application forces of 2 kg, 4 kg, and 6 kg at each temperature. The premask is immediately removed from the film sample after application by peeling the premask at a 180° peel angle and a peel rate of approximately 600"/min (1524 cm/min). Any blistering that occurs due to entrapment of air during application is developed by heating the test panel with the applied film samples at 150° F. (66° C.) for five minutes. The size and amount of the blistering that has occurred in the applied film will range from none to no adhesion of the film sample. The amount blistering is determined by comparing each of the samples applied at different application forces to a set of visual standards that are rated on a scale of 1 to 10, with 1 being no blistering and 10 being no adhesion to the panel. Each rating number is approximately twice as bad as the preceding lower rating number.

Tenting of Corrugations and Rivets and Overlap Test

On a 12"×4" (30.5 cm×10 cm) corrugated Fruehauf-painted panel having four rivets, is applied a processed test film having dimensions of 2½"×12" (6.4 cm×30.5 cm). The test film is printed with a black ink and clear coating as described in the 180° Pullback Adhesion Test. The film test sample is cut so that the long axis coincides with the MD of the film. The film is applied to the test panel using a plastic squeegee, ensuring that the film completely covers the four rivet heads. A second piece of the same film, 1"×12" (2.5 cm×30.5 cm), is applied in the same manner (not over the rivet heads but at one edge of the first layer of film laid down), so that there is an appropriate ¼" (0.6 cm) overlap of the smaller piece of processed film over the larger piece of processed film.

Once the two strips of film are applied to the test panel, the surrounding area around the rivet heads is heated with an electric heat gun to soften the film without melting it. Using a rivet brush, the film is brushed around the rivet heads so that the film is deformed, and a tight, conforming bond is obtained between the film, the rivets and surrounding area, and in the valleys with no observable bridging of the film (tenting). The test panels are set aside for 24 hours at 72° F. (22° C.)/50% relative humidity.

Some films have a tendency to want to recover and tent, both around the rivet heads, and in the valleys of the corrugated panel. After the 24 hours dwell at room temperature, any tenting is recorded. In the valleys, any lifting is noted. Care is exercised to differentiate between blistering and tenting. Tenting around the rivet head is measured in one-sixteenth inch increments of concentric circles around the rivet head.

After 24 hours at room temperature, the test panels are placed in a 150° F. (66° C.) oven for 7 days. The amount of tenting in the valleys and around the rivet heads is again read. Also, the tendency of the overlap to show any tendency to peel back upon itself or to lift up (flag) is noted after the 24 hours and the 7 days aging.

Preadherence and Slidability

A 6"×9" (15 cm×23 cm) piece of processed film is cut from a sample in which the MD coincides with the long axis of the test piece. The liner is removed from the test piece, and the four corners are folded back on itself—adhesive to adhesive approximately one-half inch (1.3 cm). The test piece is placed adhesive side down on a piece of clean glass heated to 105° F.±5° F. (41±2° C.). The sample is allowed to lay on the glass strictly under its own weight. The film is grasped along one edge and an attempt is made to slide the film along the glass surface. The film should not adhere so well that it can not be slid along the surface. If the film will not slide, then it is said to preadhere and fails the test.

The same sample is turned over and again allowed to contact the warm glass surface adhesive side up for 30 seconds. The test piece is once again turned over on the glass (adhesive side down). A 5"×8" (13 cm×20 cm) aluminum plate weighing 43 g total is centered on the film with the 8" (20 cm) dimension of the plate coinciding with the long axis of the test sample. The plate only makes contact with the film (and glass) through one inch square pads at the corners and center of the plate. After a dwell of 10 seconds, an attempt is made to drag the film across the warm glass surface with the plate in place on the film.

A slidability rating of 1 to 4 is given the film. A "1" rating is given to a film that will slide easily with no visible sticking. A "2" rating is given a film that will tug and then slide easily. A "3" rating is given a film that slides with a slip-stick motion. A "4" rating is given to a film that adheres so tightly that it will not slide with the plate in position.

EXAMPLE 1

100 parts of a dry IOA/AA (93/7) copolymer had added to it 16 parts dry Nirez® 2019 tackifier. These were diluted in ethyl acetate to a final concentration of 25% solids. 400 g of the resulting solution was mixed with 1.6 g Bisamide crosslinker (5% solution in toluene).

The components were mixed for 10 minutes with an air stirrer in a suitable container. (Alternatively, the mixture may be rolled for 30 minutes on a roller mixer to achieve mixing). The crosslinkable adhesive solution was cast onto a silcone-coated liner (of the type described in the previously incorporated Calhoun and Wilson patents) to a dry coating weight of 0.55 g/24 sq. in. The adhesive on the liner was dried in a forced draft oven for ten minutes at 150° F. (66° C.). The adhesive/liner was dry laminated to the primed side of a 2 mil (0.05 mm) cast PVC film using a twin rubber roll laminator with 20 pounds (9.1 kg) of nip force. The resultant film was processed with black ink and a clear coating as previously described. This adhesive/film combination serves as graphic marking film control for all the experimental adhesive/film examples.

EXAMPLE 2

100 parts of a dry IOA/AA (93/7) copolymer had added to it 16 parts dry Nirez® 2019 tackifier. These were diluted in ethyl acetate to a final concentration of 25% solids. 400 g of the resulting solution was mixed with 5.0 g Pycal® 94 plasticizer and 1.6 g Bisamide crosslinker (5% solution in toluene).

The components were mixed for 10 minutes with an air stirrer in a suitable container. (Alternatively, the mixture may be rolled for 30 minutes on a roller mixer to achieve mixing). The crosslinkable adhesive solution was cast onto a silicone-coated liner (of the type described in the previously incorporated Calhoun and Wilson patents) to a dry coating weight of 0.55 g/24 sq. in. The adhesive on the liner was dried in a forced draft oven for ten minutes at 150° F. (66° C.). The adhesive/liner was dry laminated to the primed side of a 2 mil (0.05 mm) cast PVC film using a twin rubber roll laminator with 20 pounds (9.1 kg) of nip force. The resulting adhesive/film system was an unprocessed graphic marking film that will apply at 40° F. (4° C.) without significant blistering compared to the control of Example 1. A corresponding processed film (printed with black ink and a clear coat as described above) applied at about 30° F. (−1° C.).

EXAMPLE 3

100 parts of a dry IOA/AA (93/7) copolymer had added to it 16 parts dry Nirez® 2019 tackifier. These were diluted in ethyl acetate to a final concentration of 25% solids. 2500 g of the resulting solution was mixed with 50.0 g Pycal® 94 plasticizer and 5.0 g Bisamide crosslinker (5% solution in toluene).

The above components were air stirrer mixed in a one gallon container. In the same manner as Examples 1 and 2, the adhesive was cast and laminated onto the film. This adhesive/film combination showed extremely good low temperature application performance. The processed film of this combination was applied at 20° F. (−7° C.) (processed) and at 30° F. (−1° C.) (unprocessed) without significant blistering. However, because of the relatively small amount of crosslinker employed, the shrinkage was excessive. At the low temperatures of the application, film brittleness was a problem, and film cracking and tearing could be observed in some applications. Accordingly, for this film construction, the stated temperatures represented the minimum conditions for satisfactory use.

EXAMPLE 4

100 parts of a dry IOA/AA (93/7) copolymer had added to it 16 parts dry Nirez® 2019 tackifier. These were diluted in ethyl acetate to a final concentration of 25% solids. 2500 g of the resulting solution was mixed with 50.0 Pycal® 94 plasticizer and 15.0 g Bisamide crosslinker (5% solution in toluene).

Graphic marking film was prepared in the same manner described for the previous examples. The example differs in that the crosslinker level in this adhesive is increased three times over that used in Example 3. This was done to reduce the excessive shrinkage experienced in Example 3. The effect of increasing the crosslinker, had minimal impact on the rest of the performance parameters of Example 3, especially the low temperature application performance, however, as desired, the amount of shrinkage was significantly reduced.

EXAMPLE 5

100 g solids of a 2-MBA/AA (90/10) having a final concentration of 40% solids in ethyl acetate was mixed with 2.0 g Pycal® 94 plasticizer and 1.75 g Bisamide crosslinker (5% solution in toluene).

In the same manner as that of the previous examples, a graphic marking film was prepared. This sample was prepared to demonstrate that other acrylate copolymer PSAs could be utilized.

EXAMPLE 6

100 g IOA/MA/AA/ABP 70/22.5/7.5/0.15 (100% solids) was provided. The copolymer had an inherent viscosity of about 0.8 dl/g. The resulting polymer was melted under pressure, pumped through a pressure fed die, coated onto a suitable paper release liner, and then laminated to the film of the previous examples. The adhesive was passed under a bank of high intensity UV lights which brought about the crosslinking reaction. A dose of 150 mj/cm$^2$ UV irradiation was applied to crosslink the polymer.

This is an example of a different acrylate copolymer PSA which was hot melt processed and UV cured. Addition of the plasticizer can be done prior to the isolation of the hot-melt from the solution in order to obtain an adhesive with improved low temperature application performance. The plasticizer must not be stripped away during the isolation process, and it must be transparent to UV irradiation and not interfere with the crosslinking reaction.

TABLE 1

| Representative Adhesive Systems | | | | | |
| --- | --- | --- | --- | --- | --- |
| Adhesive | Formula | Tackifier | IV | % Solids | X-linker/ 100 g Adh. Solution[1] |
| A | IOA/AA 93/7 | 16 Pts. Nirez 2019 | 1.7 | 25% | 0.4% |
| B | IOA/AA 93/7 | | 1.7 | 25% | 0.8% |

TABLE 1-continued

Representative Adhesive Systems

| Adhesive | Formula | Tackifier | IV | % Solids | X-linker/ 100 g Adh. Solution[1] |
|---|---|---|---|---|---|
| C | 2-MBA/AA 90/10 | | 0.8 | 40% | 1.25% |
| D | IOA/MA/AA 70/22.5/7.5 | | 1.7 | 100% | 0.2% |

[1]The crosslinker for adhesives A, B, and C is Bisamide (5% solution in toluene). The crosslinker for adhesive D is 4-acryloxybenzophenone.

TABLE 2

Properties of Graphic Marking Films made from Pycal 94-Modified Adhesive Systems

| | | 180° PB adhesion | | Shrinkage | | | | Rivets | Overlaps | Slidability | |
|---|---|---|---|---|---|---|---|---|---|---|---|
| | | Unprocessed | | Unprocessed | | Processed | | | | | |
| Adhesive[2] | Parts Pycal 94 | Alodine #/in | Fruehauf #/in | CD mils | MD mils | CD mils | MD mils | Proc 1/16 in | Proc # | Unproc | Proc |
| A | 0 | 7.7 | 4.7 | 8.9 | 9 | | | 1.2 | 3 | 2 | |
| A | 5 | 5.9 | 4.1 | 9.9 | 10.1 | | | 1.3 | 1 | 2 | |
| A | 10 | 4.9 | 2.9 | 16.6 | 11.6 | | | 1.9 | 0 | 2.5 | |
| B | 0 | 5.8 | 3.2 | | | 6.8 | 7.5 | 1.6 | | | 2.5 |
| B | 8 | 4.4 | 2.1 | | | 9.3 | 10.3 | 0.8 | | | 3 |
| C | 0 | 9.1 | 4.7 | 5 | 6 | 8 | 10 | 1 | | | |
| C | 5 | 8.7 | 4.9 | 5 | 5.5 | 10 | 12 | 1 | | | |
| D | 0 | 8.5 | 4.8 | 7 | 8 | 10 | 12 | 1 | | | |
| D | 5 | 9 | 6.7 | 9 | 10 | 14 | 18 | 1 | | | |

[2]Composition from Table 1

TABLE 3

Low Temperature Application Performance of Films Made-from Pycal-94-Modified Adhesive Systems

| | | Low Temperature Application Rating | | | | | | | |
|---|---|---|---|---|---|---|---|---|---|
| | | 50° F. | | 40° F. | | 30° F. | | 20° F. | |
| Adhesive[3] | Parts Pycal 94 | Unproc 2,4,6 kg | Proc 2,4,6 kg | Unproc 2,4,6 kg | Proc 2,4,6 kg | Unproc 2,4,6 kg | Proc 2,4,6 kg | Unproc 2,4,6 kg | Proc 2,4,6 kg |
| A | 0 | 8,3,3 | 5,1,1 | 10,10,4 | 6,1,1 | 10,8,10 | 7,6,2 | | |
| A | 5 | 1,1,1 | 1,1,1 | 5,1,1 | 3,1,1 | 9,5,5,4 | 4,2,5,1 | | |
| B | 0 | 3,5,1,1 | | 4,1,1 | | | | 10,10,7 | 7,4,5,2 |
| B | 8 | 2,1,1 | | 1,1,1 | 1,1,1 | | | 6,5,4,3 | 4,5,2,1 |

[3]Composition from Table 1

The plasticizer-modified adhesive systems and their relative performance parameters are present in Tables 1–3. As can be seen in the tables above, the addition of a plasticizer to tackified and non-tackified adhesive systems improved their ability to be applied at low temperatures which having relatively small effects on adhesion, shrinkage, slidability and related properties.

Equivalents

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A method of using a graphic marking film comprising:
   applying an adhesive-backed film sheet to a surface at a temperature below about 40° F., wherein the film sheet has first and second surfaces and an acrylate copolymer pressure sensitive adhesive system applied to one of the first and second surfaces, the acrylate copolymer pressure sensitive adhesive composition comprising:
   (i) 100 parts by weight of an acrylate copolymer pressure sensitive adhesive comprising:
      1) from about 70% to about 98% by weight of one or more monofunctional acrylates having nontertiary alkyl groups with between 1 and 14 carbon atoms; and
      2) from about 30% to about 2% by weight of a polar monomer;
   (ii) from about 2 parts to about 10 parts by weight of a plasticizer, wherein the plasticizer remains uniformly dispersed or dissolved within the acrylate copolymer pressure sensitive adhesive; and
   (ii) optionally, a crosslinking agent for the adhesive.

2. The method of claim 1 wherein the monofunctional acrylate is selected from the group consisting of ethylenically-unsaturated higher alkyl acrylates.

3. The method of claim 1 wherein the polar monomer is selected from the group consisting of ethylenically-unsaturated carboxylic acids and acrylamides.

4. The method of claim 1 wherein the crosslinking agent comprises less than about 0.8 parts by weight of a chemical crosslinker.

5. The method of claim 4 wherein the crosslinking agent is a multifunctional aziridine thermal crosslinking agent.

6. The method of claim 5 wherein the crosslinking agent is Bisamide.

7. The method of claim 1 wherein the crosslinking agent comprises between about 2 parts to about 6 parts by weight of a high $T_g$ monomer.

8. The method of claim 1 wherein the crosslinking agent is photosensitive.

9. The method of claim 8 wherein the crosslinking agent is selected from the group consisting of 2,4-bis (trichloromethyl)-6-(4-methoxy-phenyl)-s-triazine and copolymerizable benzophenones.

10. The method of claim 1 wherein the film sheet comprises a material selected from the group consisting of vinyl films, woven and nonwoven sheets, woven and nonwoven fabrics, papers and retroreflective sheeting.

11. The method of claim 1 wherein the plasticizer is selected from the group consisting of polyoxyethylene aryl ethers, adipate esters, toluenesulfonamide, dipropylene glycol dibenzoate, polyethylene glycol dibenzoate, and dibutoxyethoxyethyl formal.

* * * * *